Patented Jan. 12, 1926.

1,569,202

UNITED STATES PATENT OFFICE.

JULIUS R. PROCHNOW, OF SAN ANTONIO, TEXAS.

MEDICAL PREPARATION.

No Drawing. Application filed November 10, 1923. Serial No. 674,035.

*To all whom it may concern:*

Be it known that I, JULIUS R. PROCHNOW, a citizen of the United States, residing at San Antonio, in the county of Bexar and State of Texas, have invented certain new and useful Improvements in Medical Preparations, of which the following is a specification.

My invention relates to medical preparations for internal use.

An important object of the invention is to provide a preparation of this character, which when taken internally, will produce or liberate formaldehyde capable of killing bacteria.

In accordance with my invention I emulsify 60 parts by weight of balsam copaiba and 45 parts by weight of acacia in 60 parts by weight of water. I next dissolve 22 parts by weight of hexamethylene tetramine and 60 parts by weight of sugar in 60 parts by weight of water. These two masses are next thoroughly mixed, preferably in the proportion of 165 parts by weight of the first mass, and 142 parts by weight of the second mass. I next add to the product thus obtained 15 parts by weight of fluid extract of buchu, 2 parts by weight of fluid extract of colchicum, and 60 parts by weight of double strength sweet spirits of nitre. The entire mass is now thoroughly stirred and is allowed to stand one week. This mass which is in a liquid form will contain formaldehyde in solution. The entire mass may be taken internally without injury, and the formaldehyde in solution will be liberated, and will prevent the growth of bacteria, while exerting a healing influence.

Chemical analysis discloses the fact that by combining balsam copaiba, sweet spirits of nitre, and hexamethylene tetramine, formaldehyde will be produced. I have found that hexamethylene tetramine combined with any strong acid will produce the formaldehyde, but the formaldehyde thus produced is not strong enough to kill bacteria. I have found that it is absolutely necessary that the balsam copaiba, sweet spirits of nitre and hexamethylene tetramine be combined, for reaction upon each other, for if either is left out, a formaldehyde capable of killing bacteria will not be produced.

The preparation thus produced may be taken internally in suitable amounts, without harmful results, and checks and prevents the growth of bacteria in the urine, and exerts a healing influence upon the inflamed mucous surfaces of the genito urinary tract.

It is to be understood that the form of my invention herewith described, is to be taken as a preferred example of the same, and that various chemical equivalents may be employed in the preparation, without departing from the spirit of the invention, or the scope of the subjoined claims.

Having thus described my invention, what I claim is:

1. A preparation for internal use, comprising the constituents of balsam copaiba, sweet spirits of nitre, and hexamethylene tetramine.

2. A preparation for internal use comprising a solution of the constituents of balsam copaiba, sweet spirits of nitre, and hexamethylene tetramine, with the formaldehyde produced in solution.

3. The hereindescribed method of producing a preparation for internal use, comprising emulsifying balsam copaiba, and acacia, dissolving hexamethylene tetramine in water, thoroughly mixing the solution thus obtained with the emulsion, adding fluid extract of buchu, fluid extract of colchicum, and double strength sweet spirits of nitre, thorughly mixing the mass, and allowing the same to stand for substantially one week.

4. The hereindescribed method of producing a preparation for internal use, comprising emulsifying balsam copaiba and acacia, dissolving hexamethylene tetramine in water, thoroughly mixing the solution thus obtained with the emulsion, and adding to the mass thus obtained sweet spirits of nitre, and allowing the mass to stand for a suitable period for producing formaldehyde in solution.

In testimony whereof I affix my signature.

JULIUS R. PROCHNOW.